(12) United States Patent
Lee et al.

(10) Patent No.: US 11,256,360 B2
(45) Date of Patent: Feb. 22, 2022

(54) DISPLAY DEVICE

(71) Applicant: Samsung Display Co., Ltd., Yongin-Si (KR)

(72) Inventors: Hyo Chui Lee, Yongin-si (KR); In Soo Wang, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/151,714

(22) Filed: Jan. 19, 2021

(65) Prior Publication Data
US 2021/0375187 A1 Dec. 2, 2021

(30) Foreign Application Priority Data

Jun. 1, 2020 (KR) .................. 10-2020-0066096

(51) Int. Cl.
*G06F 3/041* (2006.01)
*G09G 3/20* (2006.01)
*G06F 3/044* (2006.01)

(52) U.S. Cl.
CPC ........ *G06F 3/04164* (2019.05); *G06F 3/0412* (2013.01); *G06F 3/0445* (2019.05); *G09G 3/2092* (2013.01); *G09G 2310/0278* (2013.01)

(58) Field of Classification Search
CPC ....... G06F 3/041–0412; G06F 3/04164; G06F 3/044–0448; G06F 2119/10; G06F 3/0488; G06F 30/394; G06F 1/1637; G06F 2203/041–04114; H01L 27/323
See application file for complete search history.

(56) References Cited

U.S. PATENT DOCUMENTS

| | | | |
|---|---|---|---|
| 9,417,739 B2 | 8/2016 | Cordeiro et al. | |
| 2015/0054772 A1* | 2/2015 | Jain | G06F 3/0446 345/174 |
| 2020/0057530 A1* | 2/2020 | Moon | G06F 3/0443 |

FOREIGN PATENT DOCUMENTS

KR    10-1752015 B1    6/2017

* cited by examiner

*Primary Examiner* — Sanjiv D. Patel
(74) *Attorney, Agent, or Firm* — Innovation Counsel LLP

(57) ABSTRACT

A display device of the disclosure includes a panel including pixels, and first sensors and second sensors overlapping the pixels, and a circuit board. The circuit board includes a first sensor pad electrically connected to a respective first sensor, a second sensor pad electrically connected to a respective second sensor, and a data pad electrically connected to respective pixels, a sensor driver, a first sensor line having one end connected to the first sensor pad and another end connected to the sensor driver, a second sensor line having one end connected to the second sensor pad and another end connected to the sensor driver, a data extension line having one end connected to the data pad, and a first decoupling capacitor connected to the first sensor line disposed between the sensor driver and a first point where the first sensor line and the data extension line cross.

20 Claims, 9 Drawing Sheets

DISPLAY DEVICE

This application claims priority to Korean Patent Application No. 10-2020-0066096, filed on, Jun. 1, 2020, and all the benefits accruing therefrom under 35 U.S.C. § 119, the content of which in its entirety is herein incorporated by reference.

BACKGROUND

1. Field

The disclosure relates to a display device.

2. Description of the Related Art

As an information technology is developed, importance of a display device, which is a connection medium between a user and information, is emphasized. Accordingly, use of a display device such as a liquid crystal display device, an organic light emitting display device, and a plasma display device has been increasing.

To satisfy user demand, a display area of the display device is enlarged and a resolution of the display area becomes high, and a non-display area and space are continuously decreasing. Accordingly, degree of integration of internal circuits in the display device becomes higher and a transmission speed of signals is increasing. Accordingly, interference between signals becomes a problem.

SUMMARY

A technical object to be solved is to provide a display device capable of preventing interference of signals between a sensor driver and a display driver with a minimum configuration.

A display device according to an embodiment of the disclosure includes a panel including pixels, and first sensors and second sensors overlapping the pixels, a circuit board. The circuit board includes a first sensor pad electrically connected to the respective first sensors, a second sensor pad electrically connected to the respective second sensors, and a data pad electrically connected to respective pixels, a sensor driver, a first sensor connection line having one end connected to the first sensor pad and the other end connected to the sensor driver, a second sensor connection line having one end connected to the second sensor pad and the other end connected to the sensor driver, a data extension line having one end connected to the data pad, and a first decoupling capacitor connected to the first sensor line disposed between the sensor driver and a first point where the first sensor connection line and the data extension line cross.

The circuit board may further include a second decoupling capacitor connected to the first sensor connection line disposed between the first point and the sensor driver.

A portion of the first sensor connection line, which extends between the first point and the sensor driver, the first decoupling capacitor, and the second decoupling capacitor may constitute a low pass filter.

A pass band of the low pass filter may correspond to a frequency of a first sensor signal received by the sensor driver through the first sensor connection line, and a cut-off band of the low pass filter may correspond to a frequency of a data signal transmitted to the data pad through the data extension line.

The sensor driver may include a sensor receiver connected to the other end of the first sensor connection line and receiving a first sensor signal through the first sensor connection line, and a sensor transmitter connected to the other end of the second sensor connection line and transmitting a second sensor signal through the second sensor connection line.

The respective first sensor and the respective second sensor may form a mutual capacitance.

The sensor receiver may include an operational amplifier having a first input terminal connected to the other end of the first sensor connection line, and a second input terminal connected to a reference power.

The sensor receiver may further include an analog-to-digital converter connected to an output terminal of the operational amplifier.

The sensor receiver may further include a capacitor and a switch connected in parallel between the first input terminal and an output terminal of the operational amplifier.

The second sensor connection line may not be connected to any decoupling capacitor between the sensor driver and a second point where the second sensor connection line and the data extension line cross.

A first pixel among the pixels may include a first transistor having a first electrode electrically connected to the data pad, and a gate electrode electrically connected to a scan line.

The first pixel may further include a second transistor having a first electrode connected to a first power line and a gate electrode connected to a second electrode of the first transistor, a storage capacitor having a first electrode connected to the first power line and a second electrode connected to the gate electrode of the second transistor, and a light emitting diode having an anode connected to a second electrode of the second transistor and a cathode connected to a second power line.

The circuit board may further include a second decoupling capacitor connected to the second sensor connection line disposed between the sensor driver and a second point where the second sensor connection line and the data extension line cross.

The circuit board may further include a third decoupling capacitor connected to the first sensor connection line disposed between the first point and the sensor driver.

The circuit board may further include a fourth decoupling capacitor connected to the second sensor connection line disposed between the second point and the sensor driver.

A portion of the first sensor connection line, which extends between the first point and the sensor driver, the first decoupling capacitor, and the third decoupling capacitor may constitute a first low pass filter.

A portion of the second sensor connection line, which extends between the second point and the sensor driver, the second decoupling capacitor, and the fourth decoupling capacitor may constitute a second low pass filter.

A pass band of the first low pass filter may correspond to a frequency of a first sensor signal received by the sensor driver through the first sensor connection line, and a cut-off band of the first low pass filter may correspond to a frequency of a data signal transmitted to the data pad through the data extension line.

A pass band of the second low pass filter may correspond to a frequency of a second sensor signal received by the sensor driver through the second sensor connection line, and a cut-off band of the second low pass filter may correspond to the frequency of the data signal.

The sensor driver may include a sensor receiver including an operational amplifier having a first input terminal connected to the other end of the first sensor connection line, and receiving a first sensor signal through the first sensor connection line, and a sensor transmitter configured to transmit a driving signal to a second input terminal of the operational amplifier.

The display device according to the disclosure may prevent interference of signals between a sensor driver and a display driver with a minimum configuration.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
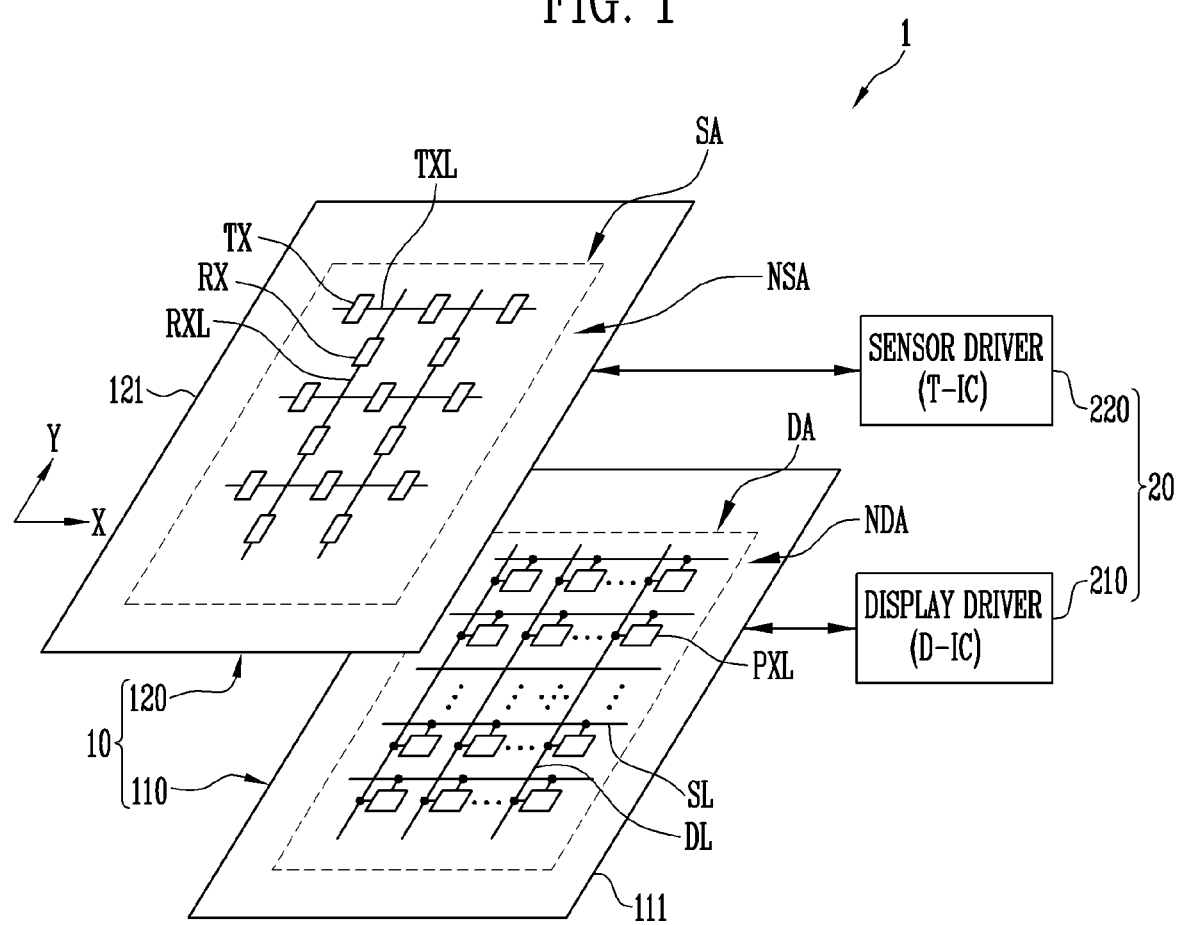
FIG. 1 is a diagram for describing a display device according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar components are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

FIG. 1 is a diagram for describing a display device according to an embodiment of the disclosure.

Referring to FIG. 1, the display device 1 according to an embodiment of the disclosure includes a panel 10 and a driving circuit 20 for driving the panel 10.

For example, the panel 10 may include a display panel 110 for displaying an image and a sensor panel 120 for sensing touch, pressure, fingerprint, hovering, and the like. For example, the panel 10 may include pixels PXL, and a first sensor RX and a second sensor TX overlapping the pixels PXL. The driving circuit 20 may include a display driver 210 for driving the display panel 110 and a sensor driver 220 for driving the sensor panel 120.

According to an embodiment, after the display panel 110 and the sensor panel 120 are manufactured separately, the display panel 110 and the sensor panel 120 may be disposed and/or combined so that at least one region overlaps. Alternatively, in another embodiment, the display panel 110 and the sensor panel 120 may be integrally manufactured. For example, the sensor panel 120 may be directly formed on at least one substrate of the display panel 110, for example, an upper substrate and/or a lower substrate of a display panel, or thin film encapsulation, another insulating layer, or other various functional films (for example, an optical layer or a protective layer).

Meanwhile, in FIG. 1, the sensor panel 120 is disposed on a front surface (for example, an upper surface on which an image is displayed) of the display panel 110, but a position of the sensor panel 120 is not limited thereto. For example, in another embodiment, the sensor panel 120 may be disposed on a back surface or both surfaces of the display panel 110. In still another embodiment, the sensor panel 120 may be disposed on at least one side edge area of the display panel 110.

The display panel 110 may include a display substrate 111 and a plurality of pixels PXL formed on the display substrate 111. The pixels PXL may be disposed in a display area DA of the display substrate 111.

The display substrate 111 may include a display area DA where an image is displayed and a non-display area NDA disposed around the display area DA. According to an embodiment, the display area DA may be disposed in a center portion of the display panel 110, and the non-display area NDA may be disposed in an edge portion of the display panel 110 to surround the display area DA.

The display substrate 111 may be a rigid substrate or a flexible substrate, and a material or physical properties are not particularly limited to any specific material or physical properties. For example, the display substrate 111 may be a rigid substrate such as glass and tempered glass, or a flexible substrate such as a thin film of plastic and metal.

Scan lines SL, data lines DL, and pixels PXL connected to the scan lines SL and the data lines DL are disposed in the display area DA. The pixels PXL are selected by a scan signal supplied from the scan lines SL, receive a data signal from the data lines DL, and emit light of a luminance corresponding to the data signal. Therefore, an image corresponding to the data signal is displayed in the display area DA. In the disclosure, a structure, a driving method, and the like of the pixels PXL are not particularly limited to any specific structure, driving method, and the like. For example, each of the pixels PXL may be implemented with pixels of various structures and/or driving methods, which are currently known. Hereinafter, a structure of exemplary pixels PXL will be described with reference to FIGS. 2 and 3.

In the non-display area NDA, various lines and/or built-in circuits connected to the pixels PXL of the display area DA may be disposed. For example, a plurality of lines for supplying various power and control signals to the display area DA may be disposed in the non-display area NDA, and a scan driver or the like may be further disposed in the non-display area NDA.

In the disclosure, a type of the display panel 110 is not particularly limited. For example, the display panel 110 may be implemented as a self-emission type display panel such as an organic light emitting display panel. Alternatively, the display panel 110 may be implemented as a non-emission type display panel such as a liquid crystal display panel. When the display panel 110 is implemented as the non-emission type, the display device 1 may additionally include a light source such as a backlight unit.

The sensor panel 120 includes a sensor substrate 121 and a plurality of sensors TX and RX formed on the sensor substrate 121. The sensors TX and RX may be disposed in a sensing area SA on the sensor substrate 121.

The sensor substrate 121 may include the sensing area SA capable of sensing a touch input or the like, and a peripheral area NSA surrounding the sensing area SA. According to an embodiment, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when a touch input or the like is provided on the display area DA, the touch input may be detected through the sensor panel 120.

The sensor substrate 121 may be a rigid or flexible substrate, and may include at least one insulating film. In addition, the sensor substrate 121 may be a transparent or translucent substrate, but is not limited thereto. That is, in the disclosure, a material and physical properties of the sensor substrate 121 are not particularly limited. For example, the sensor substrate 121 may be a rigid substrate such as glass and tempered glass, or a flexible substrate such as a thin film of a plastic and metal material. In addition, according to an embodiment, at least one substrate of the display panel 110 (for example, the display substrate 111, an encapsulation substrate and/or a thin film encapsulation layer), an insulating film or a functional film of at least one layer disposed in an inside and/or on an outer surface of the display panel 110, or the like may be used as the sensor substrate 121.

The sensing area SA is an area capable of responding to the touch input (that is, an active area of a sensor). To this end, the sensors TX and RX for sensing the touch input or the like may be disposed in the sensing area SA. According to an embodiment, the sensors TX and RX may include first sensors RX and second sensors TX. For example, the first sensors RX of the same group may be connected to the same first sensor line RXL. In addition, the second sensors TX of the same group may be connected to the same second sensor line TXL. For example, the first sensor lines RXL and the second sensor lines TXL may extend in directions intersecting each other within the sensing area SA. For example, adjacent first sensor RX and second sensor TX may form a mutual capacitance.

According to an embodiment, each of the first sensors RX and the second sensors TX may be formed of at least one of a metal material, a transparent conductive material, and various other conductive materials to have conductivity. For example, the first sensors RX and the second sensors TX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. The first sensors RX and the second sensors TX may form a mesh. In addition, the first sensors RX and the second sensors TX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nano tube, graphene, and the like. In addition to this, the first sensors RX and the second sensors TX may have conductivity by including at least one of various conductive materials. In addition, each of the first sensors RX and the second sensors TX may be formed of a single layer or multiple layers, and a cross-sectional structure thereof is not particularly limited.

When the first sensors RX (or the first sensor lines RXL) and the second sensors TX (or the second sensor lines TXL) intersect each other, an insulating film (or an insulating pattern) of at least one layer or a space may be positioned between them (especially, at least at the intersection).

Alternatively, in another embodiment, the first sensors RX (or the first sensor lines RXL) and the second sensors TX (or the second sensor lines TXL) may be formed on the same layer in the sensing area SA not to intersect each other. In this case, an interlayer insulating film is not required to be disposed between the first sensors RX and the second sensors TX, and the second sensors TX and the first sensors RX may be simultaneously patterned through a single mask process. As described above, when the second sensors TX and the first sensors RX are disposed on the same layer, a manufacturing cost of the touch sensor and the display device 1 having the same may be reduced by minimizing the mask process. In addition, a thickness of the touch sensor and the display device 1 may be minimized.

Meanwhile, the sensor lines RXL and TXL for electrically connecting the sensors TX and RX to a sensor driver 220 and the like may be disposed in the peripheral area NSA of the sensor panel 120.

The driving circuit 20 may include a display driver 210 for driving the display panel 110 and the sensor driver 220 for driving the sensor panel 120. According to an embodiment, the display driver 210 and the sensor driver 220 may be formed of integrated chips (ICs) separated from each other, or at least a portion thereof may be integrated together in one IC.

The display driver 210 is electrically connected to the display panel 110 to drive the pixels PXL. To this end, the display driver 210 may include a scan driver for supplying a scan signal to scan lines SL, a data driver for supplying a data signal to data lines DL, and a timing controller for controlling the scan driver and the data driver. According to an embodiment, the scan driver, the data driver, and/or the timing controller may be integrated into one IC, but are not limited thereto. For example, as described above, the scan driver may be separately mounted on the non-display area NDA.

The sensor driver 220 is electrically connected to the sensor panel 120 to drive the sensor panel 120. The sensor driver 220 may include a sensor transmitter and a sensor receiver. According to an embodiment, the sensor transmitter and the sensor receiver may be integrated in one IC, but are not limited thereto.

Figure 2:
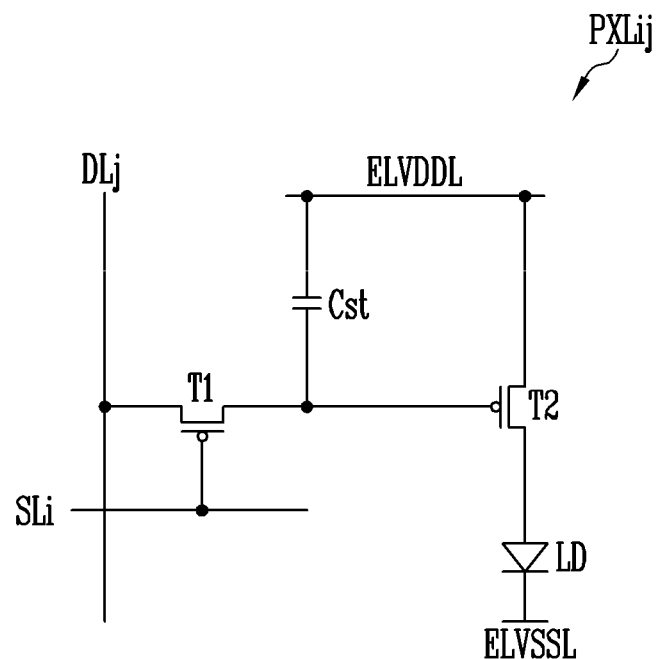
FIG. 2 is a diagram for describing a pixel according to an embodiment of the disclosure.

FIG. 2 is a diagram for describing a pixel according to an embodiment of the disclosure.

Referring to FIG. 2, a circuit of one pixel PXLij among the pixels PXL is exemplarily shown.

A gate electrode of a first transistor T1 may be connected to an i-th scan line SLi, a first electrode of the first transistor T1 may be connected to a j-th data line DLj, and a second electrode of the first transistor T1 may be connected to a second electrode of a storage capacitor Cst. The first transistor T1 may be referred to as a scan transistor. The first electrode of the first transistor T1 may be electrically connected to a data pad described later through the data line DLj.

A gate electrode of a second transistor T2 may be connected to the second electrode of the first transistor T1, a first electrode of the second transistor T2 may be connected to a first power line ELVDDL, and a second electrode of the second transistor T2 may be connected to an anode of a light emitting diode LD. The second transistor T2 may be referred to as a driving transistor.

A first electrode of the storage capacitor Cst may be connected to the first power line ELVDDL, and the second electrode of the storage capacitor Cst may be connected to the gate electrode of the second transistor T2.

The anode of the light emitting diode LD may be connected to the second electrode of the second transistor T2, and a cathode of the light emitting diode LD may be connected to a second power line ELVSSL. During a light emission period of the light emitting diode LD, a first power voltage applied to the first power line ELVDDL may be greater than a second power voltage applied to the second power line ELVSSL.

Here, the transistors T1 and T2 are shown as P-type transistors, but a person skilled in the art may replace at least one transistor with an N-type transistor by reversing a phase of a signal to be applied to the at least one transistor.

Figure 3:
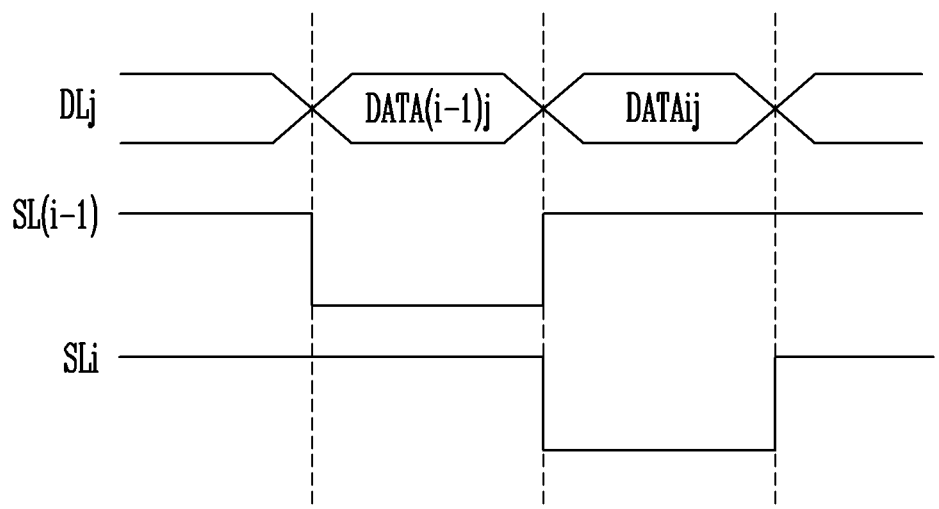
FIG. 3 is a diagram for describing a method of driving a pixel according to an embodiment of the disclosure.

FIG. 3 is a diagram for describing a method of driving a pixel according to an embodiment of the disclosure.

Data signals DATA(i−1)j and DATAij (for example, data voltages) corresponding to respective pixels PXL may be sequentially applied to the j-th data line DLj.

First, a scan signal of a turn-on level (low level) may be applied to an (i−1)-th scan line SL(i−1). At this time, the first transistor T1 of the pixel connected to the (i−1)-th scan line SL(i−1) and the j-th data line DLj may be turned on, and the data signal DATA(i−1)j applied to the data line DLj may be stored in the storage capacitor Cst of the corresponding pixel.

Next, a scan signal of a turn-on level may be applied to an i-th scan line SLi. At this time, the first transistor T1 of the pixel PXLij may be turned on, and the data signal DATAij applied to the data line DLj may be stored in the storage capacitor Cst of the pixel PXLij.

Meanwhile, when the data signal DATAij is charged to the pixel PXLij, the light emitting diode LD of the pixel connected to the (i−1)-th scan line SL(i−1) and the j-th data line DLj may emit light at a luminance corresponding to the signal DATA(i−1)j. Similarly, after the data signal DATAij is charged to the storage capacitor Cst, the light emitting diode LD of the pixel PXLij may emit light at a luminance corresponding to the data signal DATAij.

Figure 4:
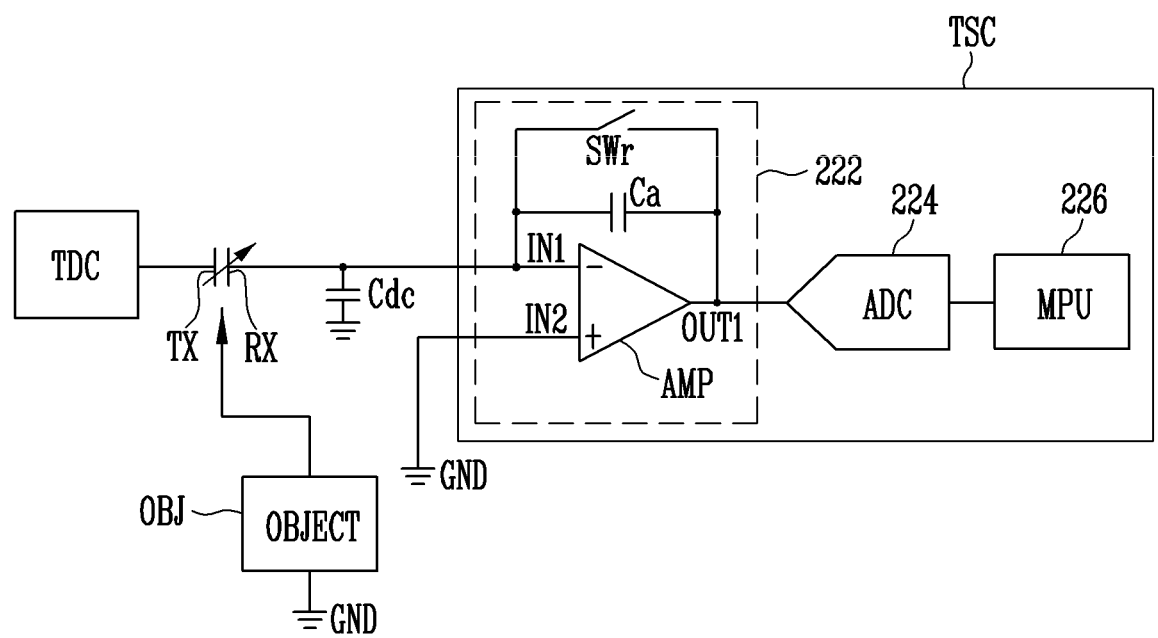
FIG. 4 is a diagram for describing a sensor driver according to an embodiment of the disclosure.

FIG. 4 is a diagram for describing a sensor driver according to an embodiment of the disclosure.

Referring to FIG. 4, a case where the sensor driver 220 operates in a mutual capacitance driving mode will be described. In FIG. 4, a configuration of the sensor panel 120 and the sensor driver 220 for one sensor channel 222 will be shown.

The sensor driver 220 may include a sensor receiver TSC and a sensor transmitter TDC. One end of a first sensor line may be electrically connected to the first sensor RX. The sensor receiver TSC may be connected to another end of the first sensor line and receive a first sensor signal through the first sensor line. One end of the second sensor line may be electrically connected to the second sensor TX. The sensor transmitter TDC may be connected to another end of the second sensor line and transmit a second sensor signal through the second sensor line.

The sensor receiver TSC may include an operational amplifier AMP, an analog-to-digital converter 224, and a processor MPU 226. For example, each sensor channel 222 may be implemented as an analog front end (AFE) including at least one operational amplifier AMP. The analog-to-digital converter 224 and the processor 226 may be provided for each sensor channel 222, or may be shared by a plurality of sensor channels 222.

The operational amplifier AMP may have a first input terminal IN1 connected to the other end of the first sensor line, and a second input terminal IN2 connected to reference power GND. For example, the first input terminal IN1 may be an inverted terminal, and the second input terminal IN2 may be a non-inverted terminal. The reference power GND may be a ground voltage or a voltage of a specific level.

The analog-to-digital converter 224 may be connected to an output terminal OUT1 of the operational amplifier AMP. A capacitor Ca and a switch SWr may be connected in parallel between the first input terminal IN1 and the output terminal OUT1.

Hereinafter, a driving method of the sensor driver 220 will be described. The second sensor signal (or a driving signal) is supplied from the sensor transmitter TDC to the second sensor TX during a sensing period. According to an embodiment, the second sensor signal may be an AC signal having a predetermined period, such as a pulse wave.

The sensor receiver TSC may receive the first sensor signal generated by the second sensor signal. The first sensor signal may be generated based on the mutual capacitance formed by the first sensor RX and the second sensor TX. According to a degree at which an object OBJ such as a user's finger approaches the second sensor TX, the mutual capacitance formed by the first sensor RX and the second sensor TX may vary, and thus the first sensing signals may also vary. Using such a difference of the first sensing signal, it is possible to detect whether the object OBJ is touched.

Meanwhile, as shown in FIG. 1, when the sensor panel 120 includes a plurality of second sensors TX, the sensor transmitter TDC may sequentially supply the second sensor signals to the second sensors TX of each group during the sensing period.

In addition, as shown in FIG. 1, when the sensor panel 120 includes a plurality of first sensors RX, the sensor receiver TSC may include a plurality of sensor channels 222, and the respective sensor channels 222 may be electrically connected to the first sensors RX of each group. The sensor receiver TSC may detect a user's input by receiving the first sensor signals through the plurality of sensor channels 222 for each of the second sensor signals and synthesizing the received first sensor signals.

The sensor channel 222 may generate an output signal corresponding to a voltage difference between the first and second input terminals IN1 and IN2. For example, the sensor channel 222 may amplify the difference voltage of the first and second input terminals IN1 and IN2 to a degree corresponding to a predetermined gain and output the amplified voltage.

According to an embodiment, the sensor channel 222 may be implemented as an integrator. In this case, the capacitor Ca and the switch SWr may be connected in parallel between the first input terminal IN1 and the output terminal OUT1 of the operational amplifier AMP. For example, the switch SWr is turned on before the first sensor signal is received, and thus charges of the capacitor Ca may be initialized. At a time when the first sensor signal is received, the switch SWr may be turned off.

The analog-to-digital converter 224 converts an analog signal input from a sensor channel 222 connected thereto into a digital signal. The processor 226 may analyze the digital signal to detect a user input.

According to an embodiment of the disclosure, a decoupling capacitor Cdc electrically connected to the first sensor line may be further provided. For example, a first electrode of the decoupling capacitor Cdc may be connected to the first sensor line, and a second electrode of the decoupling capacitor Cdc may be connected to the reference power GND.

Figure 5:
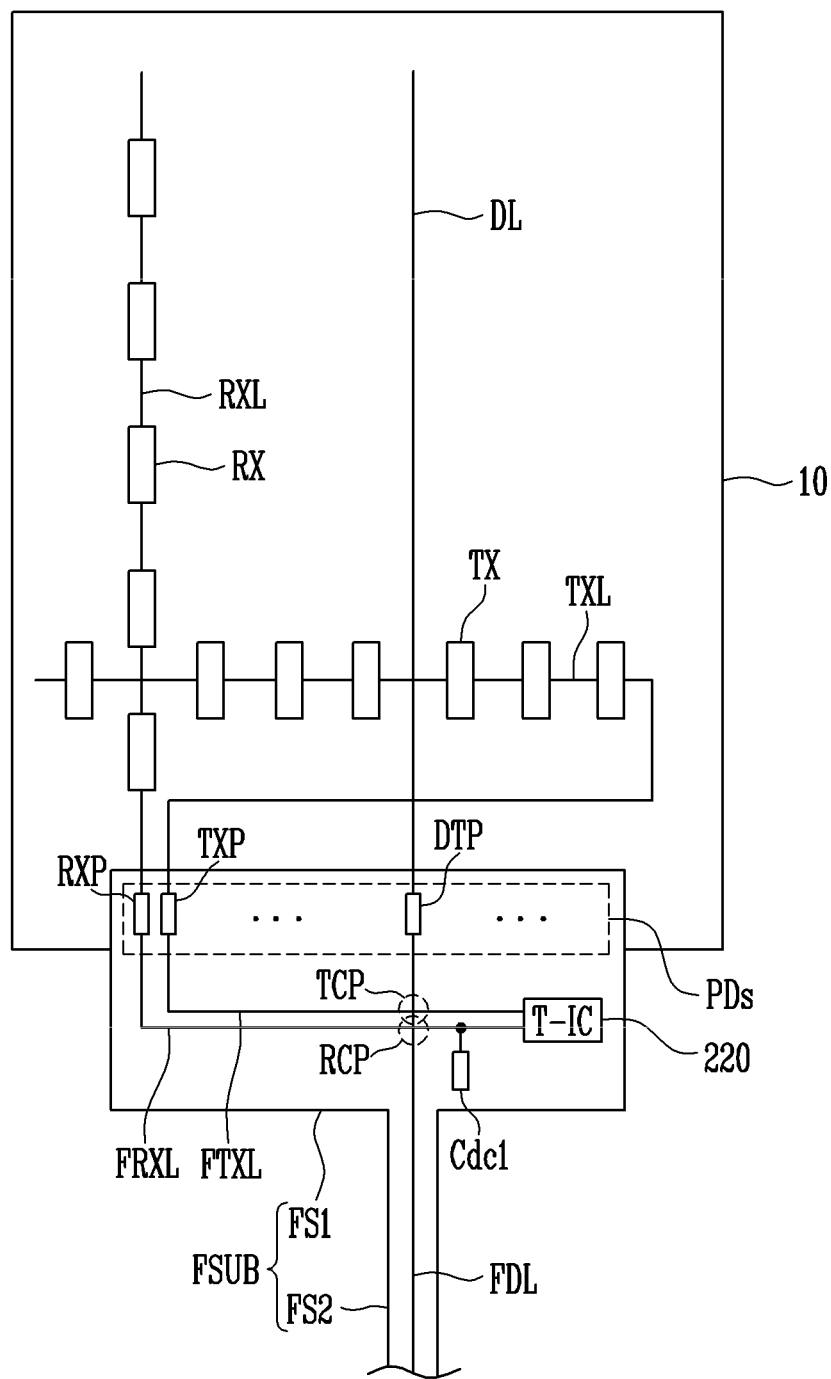
FIGS. 5 and 6 are diagrams for describing decoupling capacitors according to embodiments of the disclosure.
Figure 6:
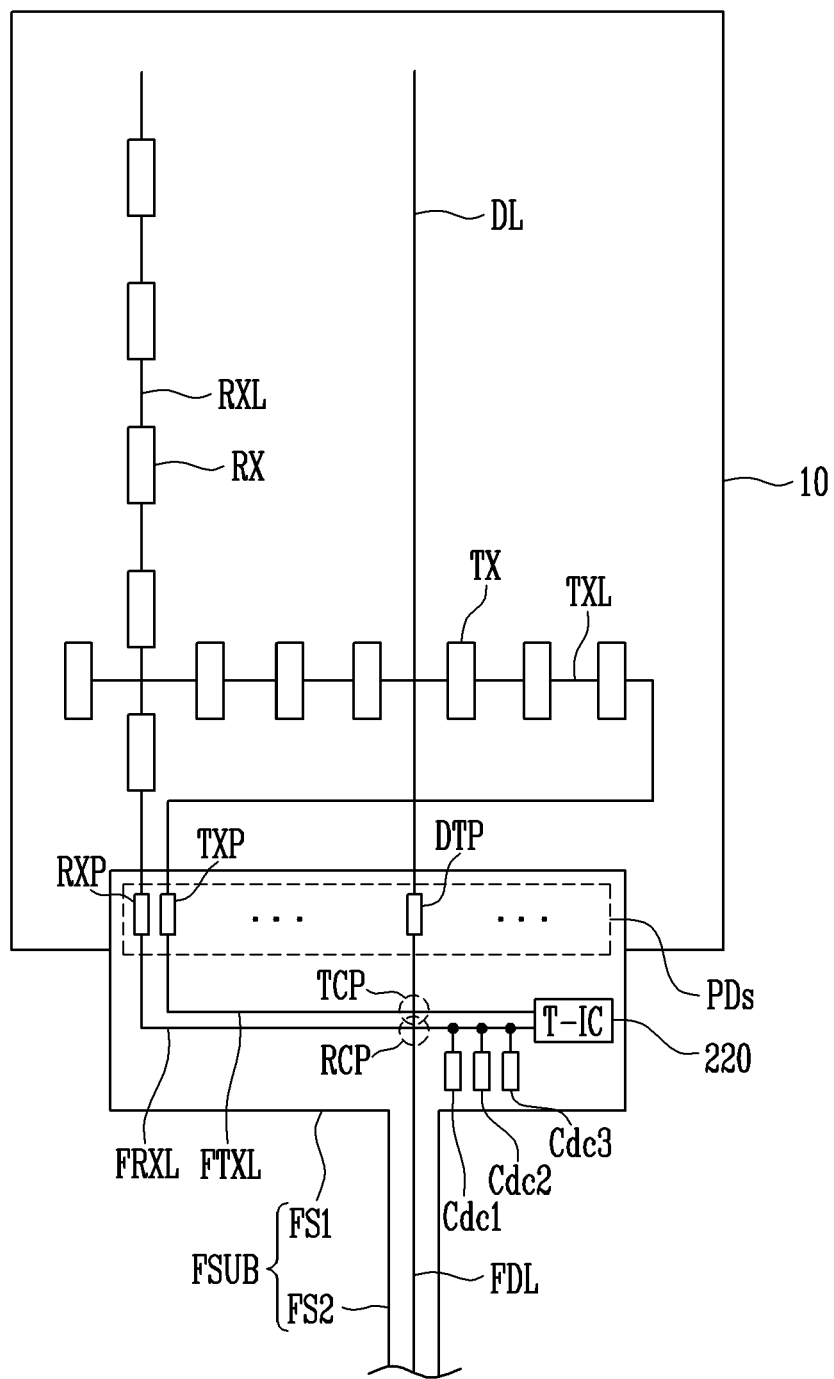

FIGS. 5 and 6 are diagrams for describing decoupling capacitors according to embodiments of the disclosure.

Referring to FIG. 5, the display device 1 may include a circuit board FSUB connected to the panel 10.

The circuit board FSUB may include a first sensor pad RXP electrically connected to the first sensor RX, a second sensor pad TXP electrically connected to the second sensor TX, and a data pad DTP electrically connected to the pixels PXL. The circuit board FSUB may include a sensor pad portion PDs including at least one first sensor pad RXP, at least one second sensor pad TXP, and at least one data pad DTP. Although not shown, the panel 10 may include a panel pad portion, and the panel pad portion may be electrically connected to sensor pad portion PDs of the circuit board FUSB.

The circuit board FSUB may further include the sensor driver 220, at least one first sensor connection line FRXL, at least one second sensor connection line FTXL, at least one data extension line FDL, and a first decoupling capacitor Cdc1. For convenience of description, only a first electrode of the first decoupling capacitor Cdc1 is shown in FIG. 5. For example, the sensor driver 220, the first sensor connection line FRXL, the second sensor connection line FTXL, the sensor pad portion PDs, and the first decoupling capacitor Cdc1 may be positioned in a main area FS1 of the circuit board FSUB. For example, the data extension line FDL may extend into a sub area FS2 of the circuit board FSUB. For example, the main area FS1 may have a relatively large area to integrate various circuit elements, and the sub area FS2 may have a relatively small area to integrate lines. For example, the data extension line FDL may extend along the sub area FS2 and may be connected to the display driver 210. Meanwhile, the sub area FS2 may be configured in a cable shape.

The first sensor connection line FRXL may have one end connected to the first sensor pad RXP and the other end connected to the sensor driver 220. For example, the one end of the first sensor connection line FRXL may be connected to the first sensor RX through the first sensor pad RXP and the first sensor line RXL. For example, the other end of the first sensor connection line FRXL may be connected to the first input terminal IN1 of the operational amplifier AMP of the sensor receiver TSC.

The second sensor connection line FTXL may have one end connected to the second sensor pad TXP and the other end connected to the sensor driver 220. For example, the one end of the second sensor connection line FTXL may be connected to the second sensor TX through the second sensor pad TXP and the second sensor line TXL. For example, the other end of the second sensor connection line FTXL may be connected to the sensor transmitter TDC.

One end of the data extension line FDL may be connected to the data pad DTP. For example, the one end of the data extension line FDL may be connected to the pixel PXL through the data pad DTP and the data line DL. As described above, another end of the data extension line FDL may be connected to the display driver 210.

The first decoupling capacitor Cdc1 may be connected to the first sensor connection line FRXL disposed between a first point RCP where the first sensor connection line FRXL and the data extension line FDL cross, and the sensor driver 220.

A portion of the first sensor connection line FRXL which extends between the first point RCP and the sensor driver 220, and the first decoupling capacitor Cdc1 may constitute a low pass filter. A pass band of the low pass filter may correspond to a frequency of the first sensor signal received by the sensor driver 220 through the first sensor connection line FRXL. In addition, a cut-off band of the low pass filter may correspond to a frequency of the data signal transmitted to the data pad DTP through the data extension line FDL.

As described above, increasing a transmission speed of signals including the data signal is a latest trend. A short rising/falling transition time is required for accurate data transmission. Due to the shorten transition time, the data signal includes a high frequency component, and such a high frequency component is coupled to surrounding signals and causes crosstalk. In particular, the first sensor connection line FRXL overlapping the data extension line FDL at the first point RCP is most affected by the crosstalk. The second sensor connection line FTXL also overlaps the data extension line FDL at a second point TCP, but a crosstalk effect is less severe than that of the first sensor connection line FRXL since a voltage of the second sensor connection line FTXL is maintained by the sensor transmitter TDC. On the other hand, since the first sensor connection line FRXL receives the first sensor signal in a floating state, the first sensor connection line FRXL becomes sensitive to the crosstalk. A changed voltage level due to the crosstalk may occur a problem that the user's input is incorrectly determined.

To solve this, in an embodiment of the disclosure, the low pass filter may be formed using the first decoupling capacitor Cdc1$a$ and a resistance component of the first sensor connection line FRXL. Therefore, the first sensor signal having a relatively low frequency may be passed, and noise by a data signal having a relatively high frequency may be blocked.

In addition, in an embodiment of the disclosure, a physical position of the contact point of the first decoupling capacitor Cdc1 and the first sensor connection line FRXL may be set between the first point RCP and the sensor driver 220. A crosstalk voltage component may be generated at the first point RCP, and may spread in both directions of the first sensor connection line FRXL from the first point RCP. To prevent malfunction of the sensor driver 220, it is more effective to connect the low pass filter to area first sensor connection line FRXL disposed between the first point RCP and the sensor driver 220.

In the present embodiment, a signal transmitted at a high speed is described as the data signal, but an embodiment of the disclosure may be applied to all signals having a signal line overlapping the first sensor connection line FRXL as a high speed signal transmitted from the display driver 210.

Referring to FIG. 6, the circuit board FSUB may further include a second decoupling capacitor Cdc2 connected to the first sensor connection line FRXL disposed between the first point RCP and the sensor driver 220. Similar to that described with reference to FIG. 5, the portion of the first sensor connection line FRXL, which extends between the first point RCP and the sensor driver 220, the first decoupling capacitor Cdc1, and the second decoupling capacitor Cdc2 may constitute a low pass filter. Similarly, the circuit board FSUB may further include a third decoupling capacitor Cdc3. Contents of the low pass filter refer to the description of FIG. 5.

As described above, when using a plurality of decoupling capacitors Cdc1, Cdc2, and Cdc3, the decoupling capacitors Cdc1, Cdc2, and Cdc3 may have a small capacity that does not affect the first sensor signal. For example, a capacity of the decoupling capacitors Cdc1, Cdc2, and Cdc3 may be set within a range of 1 pF to 100 pF. However, the capacity of the decoupling capacitors Cdc1, Cdc2, and Cdc3 may vary according to a specification such as a size, an area, a length, and a material of each element. In addition, when the plurality of decoupling capacitors Cdc1, Cdc2, and Cdc3 of the small capacity are distributed and mounted as in the present embodiment, a coupling may be decrease.

As described above, the second sensor connection line FTXL also overlaps the data extension line FDL at the second point TCP, but a voltage of the second sensor connection line FTXL is maintained by the sensor transmitter TDC, and thus the crosstalk effect is relatively small. Therefore, the second sensor connection line FTXL may not be connected to any decoupling capacitor between the second point TCP where the second sensor connection line FTXL and the data extension line FDL overlap, and the sensor driver 220. Therefore, a configuration cost may be reduced.

Figure 7:
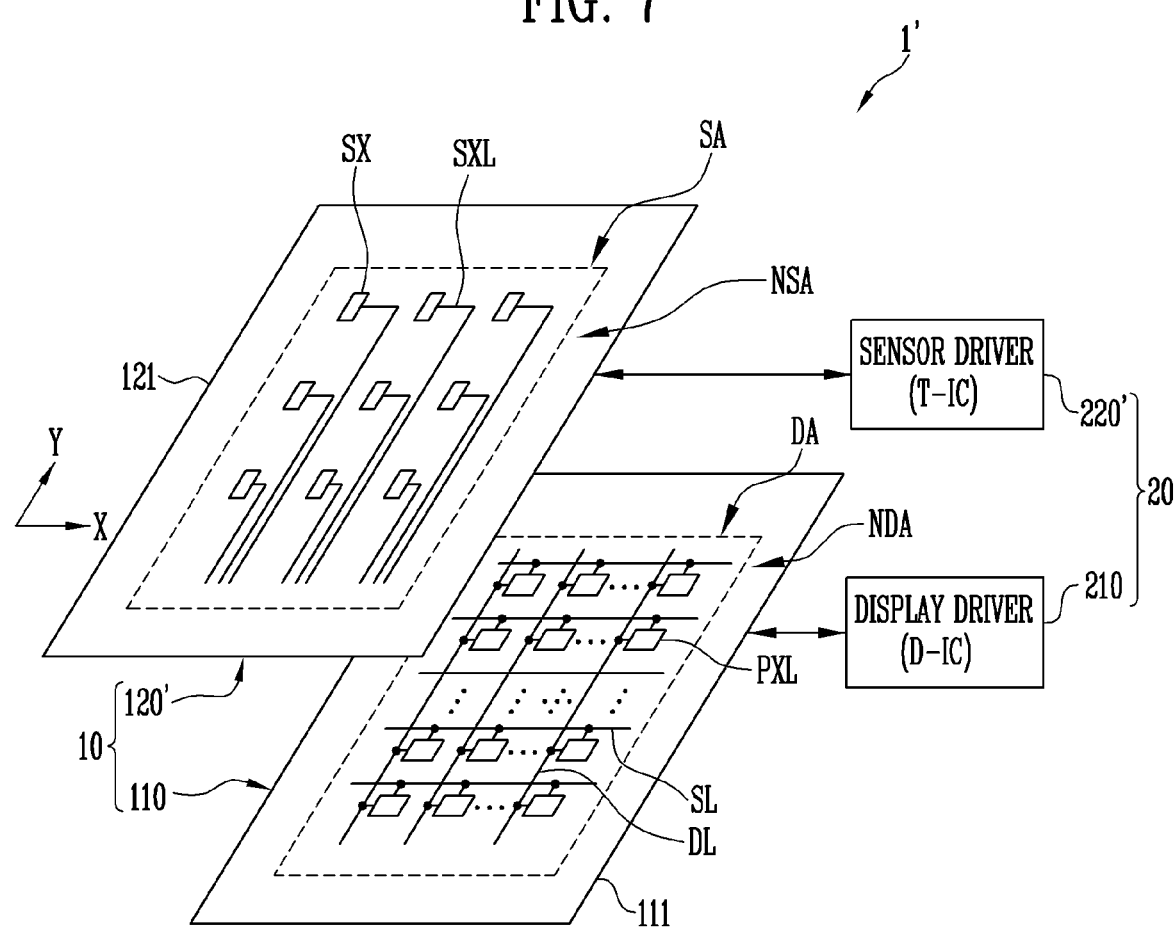
FIG. 7 is a diagram for describing a display device according to another embodiment of the disclosure.

FIG. 7 is a diagram for describing a display device according to another embodiment of the disclosure.

Referring to FIG. 7, the display device 1' of FIG. 7 is different from the display device 1 of FIG. 1 in that a sensor panel 120' of the display device 1' includes sensors SX of a self-capacitance type and sensor lines SXL. For example, each of sensors SX may be connected to a sensor driver 220' through a dedicated sensor line SXL.

Figure 8:
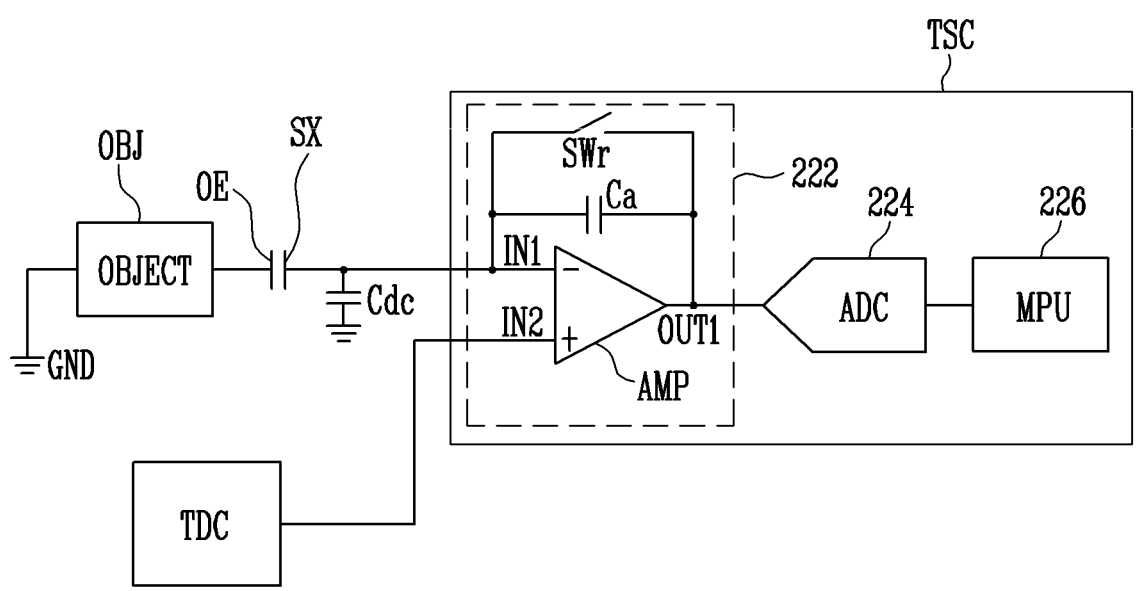
FIG. 8 is a diagram for describing a sensor driver according to another embodiment of the disclosure.

FIG. 8 is a diagram for describing a sensor driver according to another embodiment of the disclosure.

Referring to FIG. 8, an internal configuration of a sensor receiver TSC and a sensor transmitter TDC may be substantially the same as a case of FIG. 4. Repetitive description thereof will be omitted, and differences will be mainly described below.

In the present embodiment, the sensor receiver TSC may include the operational amplifier AMP in which the first input terminal IN1 is connected to the other end of the first sensor line. The one end of the first sensor line may be connected to the first sensor SX.

The sensor transmitter TDC may transmit a driving signal to the second input terminal IN2 of the operational amplifier AMP.

The sensor receiver TSC may sense a first sensor SX using the first sensor signal generated by the driving signal. When the object OBJ such as a user's finger is close to the first sensor SX, the first sensor signal is generated based on a self-capacitance formed by an object surface OE and the first sensor SX. On the other hand, when the object OBJ is not close to the first sensor SX, the first sensing signal is generated regardless of the self-capacitance. By using such a difference of the first sensing signal, it is possible to detect whether or not the object OBJ is input.

According to an embodiment of the disclosure, a decoupling capacitor Cdc electrically connected to the first sensor line may be further provided. For example, a first electrode of the decoupling capacitor Cdc may be connected to the first sensor line, and a second electrode of the decoupling capacitor Cdc may be connected to the reference power GND.

Figure 9:
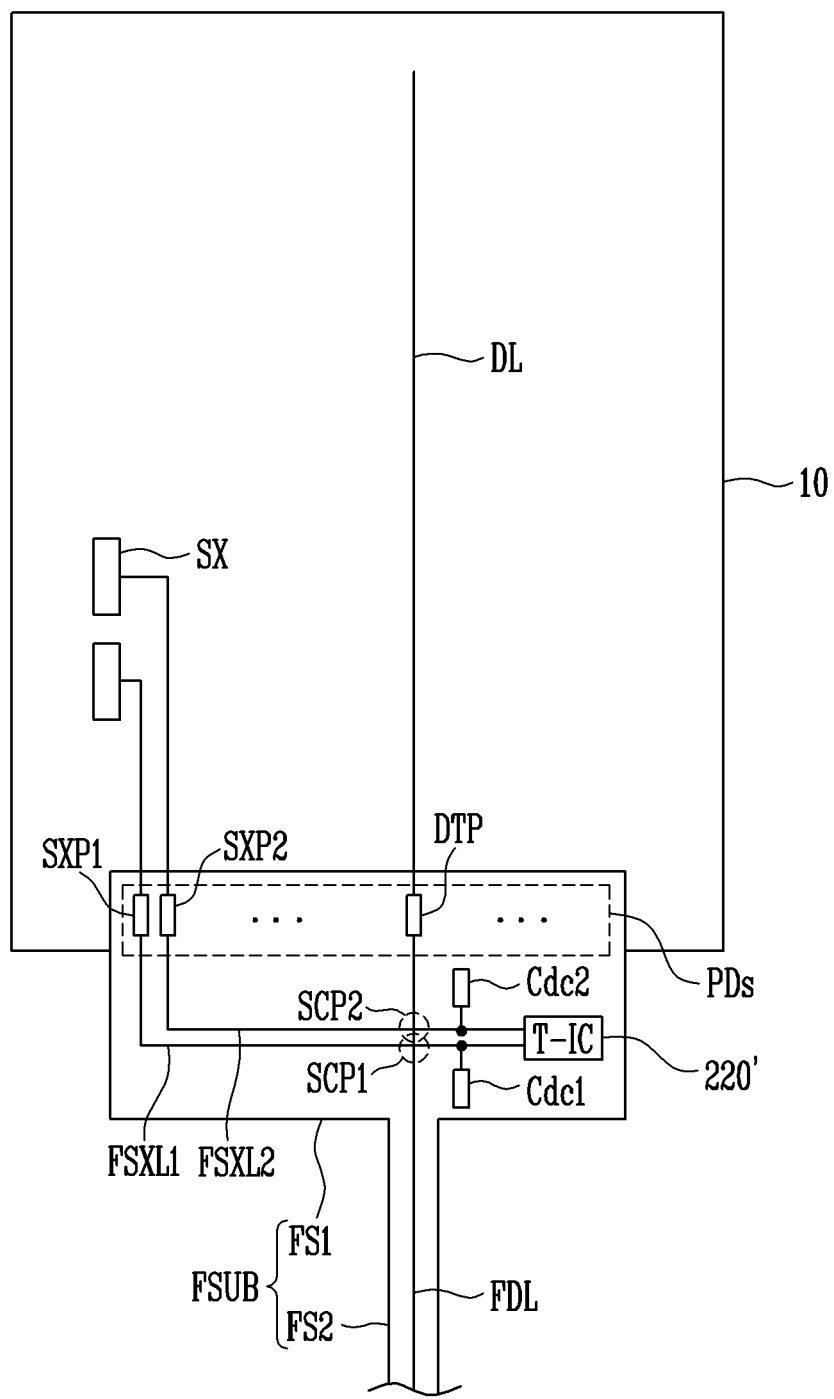
FIGS. 9 and 10 are diagrams for describing decoupling capacitors according to other embodiments of the disclosure.
Figure 10:
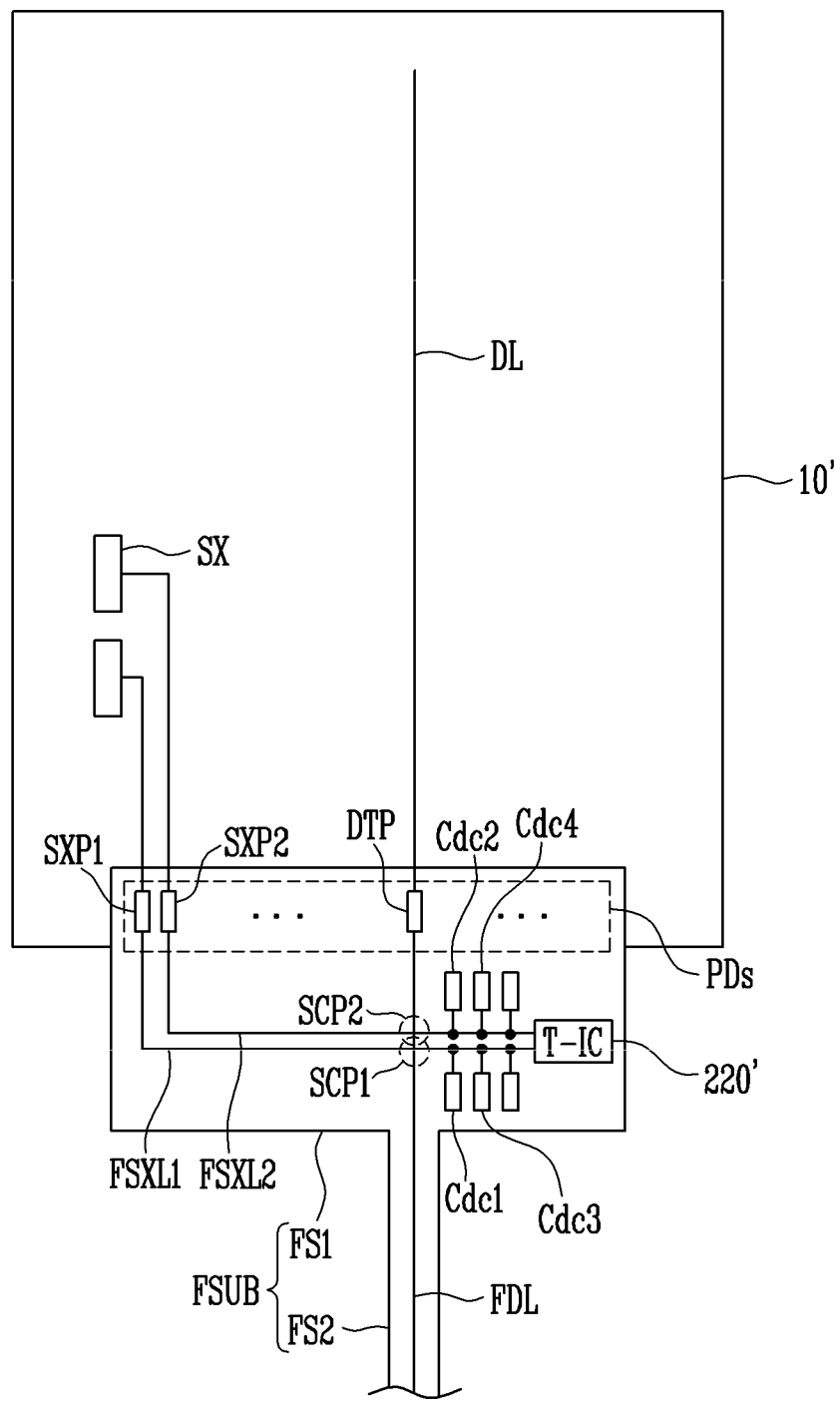

FIGS. 9 and 10 are diagrams for describing decoupling capacitors according to other embodiments of the disclosure. In describing FIGS. 9 and 10, description overlapping contents of FIGS. 5 and 6 will be omitted.

The circuit board FSUB may include a first sensor pad SXP1 electrically connected to the first sensor SX and a second sensor pad SXP2 electrically connected to a second sensor SX (different from the first sensor SX).

Referring to FIG. 9, the circuit board FSUB may further include a first decoupling capacitor Cdc1 and a second decoupling capacitor Cdc2. The first decoupling capacitor Cdc1 may be connected to the first sensor line FSXL1 disposed between the first point SCP1 where the first sensor line FSXL1 and the data extension line FDL cross, and a sensor driver 220'. The second decoupling capacitor Cdc2 may have be connected to the second sensor line FSXL2 disposed between the second point SCP2 where the second sensor line FSXL2 and the data extension line FDL cross, and the sensor driver 220'.

Referring to FIG. 8, the sensor channels 222 connected to the sensors SX may receive sensor signals when the sensors SX are in a floating state, and thus the sensor channels 222 may be sensitive to crosstalk. Therefore, according to the present embodiment, the crosstalk may be effectively prevented by connecting decoupling capacitors Cdc1, Cdc2, . . . to sensor lines FSXL1, FSXL2, . . . , respectively. An additional effect refers to the description of FIG. 5.

Referring to FIG. 10, the first sensor line FSXL1 may be connected to a plurality of decoupling capacitors Cdc1, Cdc3, . . . between the first point SCP1 and the sensor driver 220'. A portion of the first sensor line FSXL1, which extends between the first point SCP1 and the sensor driver 220', the first decoupling capacitor Cdc1, and the third decoupling capacitor Cdc3 may constitute a first low pass filter. A pass band of the first low pass filter may correspond to the frequency of the first sensor signal received by the sensor driver 220' through the first sensor line FSXL1, and a cut-off band of the first low pass filter may correspond to the frequency of the data signal transmitted to the data pad DTP through the data extension line FDL.

Similarly, the second sensor line FSXL2 may be connected to a plurality of decoupling capacitors Cdc2, Cdc4, . . . between the second point SCP2 and the sensor driver 220'. A portion of the second sensor line FSXL2, which extends between the second point SCP2 and the sensor driver 220, the second decoupling capacitor Cdc2, and the fourth decoupling capacitor Cdc4 may constitute a second low pass filter. A pass band of the second low pass filter may correspond to a frequency of the second sensor signal received by the sensor driver 220' through the second sensor line FSXL2, and a cut-off band of the second low pass filter may correspond to the frequency of the data signal.

When the plurality of decoupling capacitors Cdc1, Cdc2, Cdc3, and Cdc4 of a small capacity are distributed and mounted as in the present embodiment, a coupling reduction effect increases. An additional effect refers to the description of FIG. 6.

The referred drawings and the detailed description of the disclosure described are merely examples of the disclosure, are used for merely describing the disclosure, and are not intended to limit the meaning and the scope of the disclosure described in the claims. Therefore, those skilled in the art may understand that various modifications and equivalent other embodiments are possible from these. Thus, the true scope of the disclosure should be determined by the technical spirit of the appended claims.

What is claimed is:
1. A display device comprising:
   a panel including pixels and first sensors and second sensors overlapping the pixels; and
   a circuit board, the circuit board including:
      a first sensor pad electrically connected to a respective first sensor, a second sensor pad electrically con- nected to a respective second sensor, and a data pad electrically connected to respective pixels, a sensor driver, a first sensor connection line having one end connected to the first sensor pad and the other end connected to the sensor driver, a second sensor connection line having one end connected to the second sensor pad and the other end connected to the sensor driver, a data extension line having one end connected to the data pad, and a first decoupling capacitor connected to the first sensor connection line disposed between the sensor driver and a first point where the first sensor connection line and the data extension line cross.

2. The display device according to claim 1, wherein the circuit board further includes a second decoupling capacitor connected to the first sensor connection line disposed between the first point and the sensor driver.

3. The display device according to claim 2, wherein a portion of the first sensor connection line, which extends between the first point and the sensor driver, the first decoupling capacitor, and the second decoupling capacitor constitute a low pass filter.

4. The display device according to claim 3, wherein a pass band of the low pass filter corresponds to a frequency of a first sensor signal received by the sensor driver through the first sensor connection line, and a cut-off band of the low pass filter corresponds to a frequency of a data signal transmitted to the data pad through the data extension line.

5. The display device according to claim 1, wherein the sensor driver comprises:

a sensor receiver connected to the other end of the first sensor connection line and receiving a first sensor signal through the first sensor connection line; and a sensor transmitter connected to the other end of the second sensor connection line and transmitting a second sensor signal through the second sensor connection line.

6. The display device according to claim 5, wherein the respective first sensor and the respective second sensor form a mutual capacitance.

7. The display device according to claim 6, wherein the sensor receiver includes an operational amplifier having a first input terminal connected to the other end of the first sensor connection line, and a second input terminal connected to a reference power.

8. The display device according to claim 7, wherein the sensor receiver further includes an analog-to-digital converter connected to an output terminal of the operational amplifier.

9. The display device according to claim 7, wherein the sensor receiver further includes a capacitor and a switch connected in parallel between the first input terminal and an output terminal of the operational amplifier.

10. The display device according to claim 1, wherein the second sensor connection line is not connected to any decoupling capacitor between the sensor driver and a second point where the second sensor connection line and the data extension line cross.

11. The display device according to claim 1, wherein a first pixel among the pixels includes a first transistor having a first electrode electrically connected to the data pad, and a gate electrode electrically connected to a scan line.

12. The display device according to claim 11, wherein the first pixel further comprises:

a second transistor having a first electrode connected to a first power line and a gate electrode connected to a second electrode of the first transistor;

a storage capacitor having a first electrode connected to the first power line and a second electrode connected to the gate electrode of the second transistor; and a light emitting diode having an anode connected to a second electrode of the second transistor and a cathode connected to a second power line.

13. The display device according to claim 1, wherein the circuit board further includes a second decoupling capacitor connected to the second sensor connection line disposed between the sensor driver and a second point where the second sensor connection line and the data line cross.

14. The display device according to claim 13, wherein the circuit board further includes a third decoupling capacitor connected to the first sensor connection line disposed between the first point and the sensor driver.

15. The display device according to claim 14, wherein the circuit board further includes a fourth decoupling capacitor connected to the second sensor connection line disposed between the second point and the sensor driver.

16. The display device according to claim 15, wherein a portion of the first sensor connection line, which extends between the first point and the sensor driver, the first decoupling capacitor, and the third decoupling capacitor constitute a first low pass filter.

17. The display device according to claim 16, wherein a portion of the second sensor connection line, which extends between the second point and the sensor driver, the second decoupling capacitor, and the fourth decoupling capacitor constitute a second low pass filter.

18. The display device according to claim 17, wherein a pass band of the first low pass filter corresponds to a frequency of a first sensor signal received by the sensor driver through the first sensor connection line, and a cut-off band of the first low pass filter corresponds to a frequency of a data signal transmitted to the data pad through the data extension line.

19. The display device according to claim 18, wherein a pass band of the second low pass filter corresponds to a frequency of a second sensor signal received by the sensor driver through the second sensor connection line, and a cut-off band of the second low pass filter corresponds to the frequency of the data signal.

20. The display device according to claim 13, wherein the sensor driver comprises:

a sensor receiver including an operational amplifier having a first input terminal connected to the other end of the first sensor connection line, and receiving a first sensor signal through the first sensor connection line; and a sensor transmitter configured to transmit a driving signal to a second input terminal of the operational amplifier.

* * * * *